United States Patent
Yang et al.

(10) Patent No.: US 8,437,072 B2
(45) Date of Patent: May 7, 2013

(54) INDIVIDUALLY ADDRESSABLE NANO-SCALE MECHANICAL ACTUATORS

(75) Inventors: Jianhua Yang, Palo Alto, CA (US); R. Stanley Williams, Portola Valley, CA (US); William Tong, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 13/256,256

(22) PCT Filed: Jun. 30, 2009

(86) PCT No.: PCT/US2009/049156
§ 371 (c)(1),
(2), (4) Date: Sep. 13, 2011

(87) PCT Pub. No.: WO2011/002443
PCT Pub. Date: Jan. 6, 2011

(65) Prior Publication Data
US 2012/0002267 A1     Jan. 5, 2012

(51) Int. Cl.
*G02B 26/00*     (2006.01)

(52) U.S. Cl.
USPC ............................................. 359/291

(58) Field of Classification Search ............. 359/290, 359/291, 292, 295, 318, 214, 223, 224, 237, 359/242, 254
See application file for complete search history.

(56) References Cited

U.S. PATENT DOCUMENTS 7,453,623 B2 * 11/2008 Uchida et al. ................. 359/291

* cited by examiner

*Primary Examiner* — Tuyen Tra

(57) ABSTRACT

An addressable nano-scale mechanical actuator is formed at the intersection of two nanowires. The actuator has an active region disposed between the two nanowires, which form the electrodes of the actuator. The active region contains an electrolytically decomposable material. When an activation voltage is applied to the electrodes, the material releases a gas that forms a bubble at one electrode, causing a bulging of a top surface of the actuator. The bulging may be used, via mechanical coupling, to provide mechanical actuation on a nanometer scale. The nanowires may be arranged in a two-dimensional array to provide an array of individually addressable actuators.

15 Claims, 5 Drawing Sheets

INDIVIDUALLY ADDRESSABLE NANO-SCALE MECHANICAL ACTUATORS

BACKGROUND

In the last two decades, there has been tremendous progress in combining micro-electronics with miniature mechanical devices to achieve various functionalities that could not be implemented on a regular scale. Leveraging the micro-fabrication techniques for Si-based integrated circuits, electronics and micrometer-sized mechanical elements, sensors, and actuators can be integrated on a common substrate to produce micro-electro-mechanical system (MEMS) devices. MEMS devices have found wide applications in aerospace, automotive, biotechnology, robotics, and consumer electronics. As an example, many display devices based on the DLP projection technology use a digital micro-mirror device (DMD) chip, which is a MEMS device that has on its surface several hundred thousand micro-mirrors corresponding to the pixels of the display. The orientation of each micro-mirror can be individually controlled to alter how the mirror reflects the light from a light source.

As the trend of miniaturization continues, the frontier of fabricating miniaturized devices has now moved to the nanometer scale, with the dimensions of the electronic and mechanical elements of a nano-electro-mechanical system (NEMS) device often measured in nanometers or tens of nanometers. Compared to MEMS devices, NEMS devices have the potential of offering new functionalities not only due to the orders-of-magnitude smaller device sizes but also for the reason that nano-scale devices can exhibit physical phenomena that are quite different from those at the micro-scale.

One major challenge in developing NEMS devices, however, is the difficulty in providing a suitable actuation mechanism for operating nano-scale mechanical devices. Actuation mechanisms used in MEMS devices typically cannot be readily scaled down to the nano-scale while maintaining their operability or individual addressability. It has been proposed to use piezoelectric materials to form nano-scale actuators, but such piezoelectric components are difficult and expensive to fabricate on the nano-scale.

BRIEF DESCRIPTION OF THE DRAWINGS

Some embodiments of the invention are described, by way of example, with respect to the following figures.

DETAILED DESCRIPTION

Figure 1:
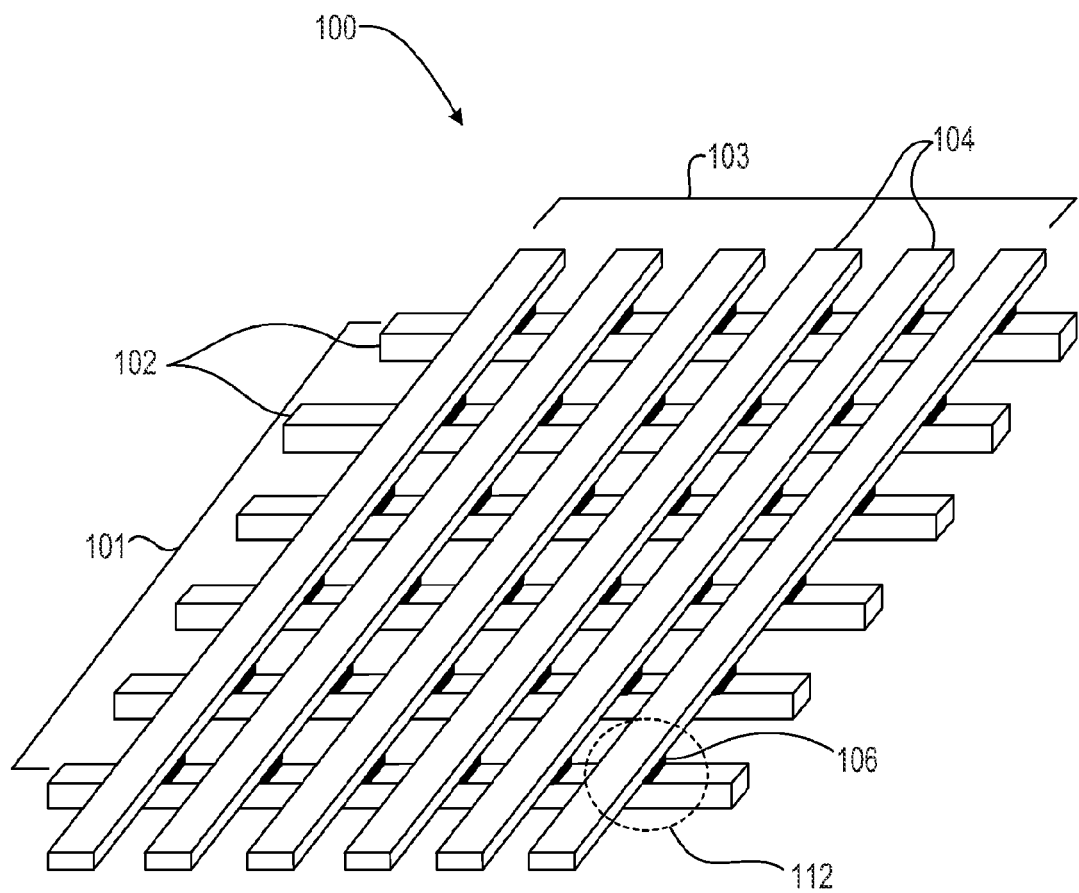
FIG. 1 is a schematic perspective view of a two-dimensional nano-scale actuator array with individually addressable mechanical actuators, in accordance with an embodiment of the invention.

FIG. 1 shows an actuator array 100 that has a plurality of nano-scale mechanical actuators in accordance with an embodiment of the invention. As used hereinafter, the term "nano-scale" means the object has one or more dimensions smaller than one micrometer. The actuator array 100 is implemented in the form of a nanowire crossbar array, which has a first layer 101 of approximately parallel nanowires 102 that are laid over a second layer 103 of generally parallel nanowires 104. Each nanowire is formed of a conductive material, which may be a metal such as platinum, aluminum, etc., a conductive oxide such as indium tin oxide, zinc oxide, iridium oxide or ruthenium oxide, or a conductive polymer, or any other suitable conductive material. The nanowires 104 of the first layer run in a direction that is at an angle to the direction in which the nanowires 104 in the second layer run. The angle may be around 90 degrees (i.e., perpendicular) or any other angle depending on the particular device layout. The two layers of nanowires 102 and 104 form a two-dimensional lattice which is commonly referred to as a crossbar structure, with each nanowire 102 in the first layer intersecting a plurality of the nanowires 104 of the second layer. As will be described in greater detail below, each intersection region 106 may be formed, in accordance with the invention, into a nano-scale mechanical actuator 112.

The nanowires 102 and 104 of the first and second layers 101 and 103 have a width and a thickness on the scale of nanometers. For example, the nanowires may have a wide in the range of 15 nm to 500 nm, and a thickness of 5 nm to 500 nm. The nanowire layers may be fabricated using well-known fabrication techniques, including various patterning, deposition, and/or etching techniques such as mechanical nano-imprinting, photolithography, electron-beam lithography, chemical wet etching or plasma etching, etc. The nanowires may have various cross-sectional shapes. In a preferred embodiment, the nanowires 102 and 104 have a generally rectangular cross-section, with a width that may be significantly greater than the thickness.

As a feature of the embodiment of the invention, each actuator 112 formed at an intersection 106 of the nanowires of the first and second layers 101 and 103 can be individually addressed for activation by selecting the two nanowires that form the intersection. The addressing may be done, for example, using the well-known multiplexing/demultiplexing architecture. To that end, the nanowire crossbar 100 may be connected to microscale address wire leads or other electronic leads, through a variety of different connection schemes to incorporate the nanowires into electronic circuits.

Figure 2:
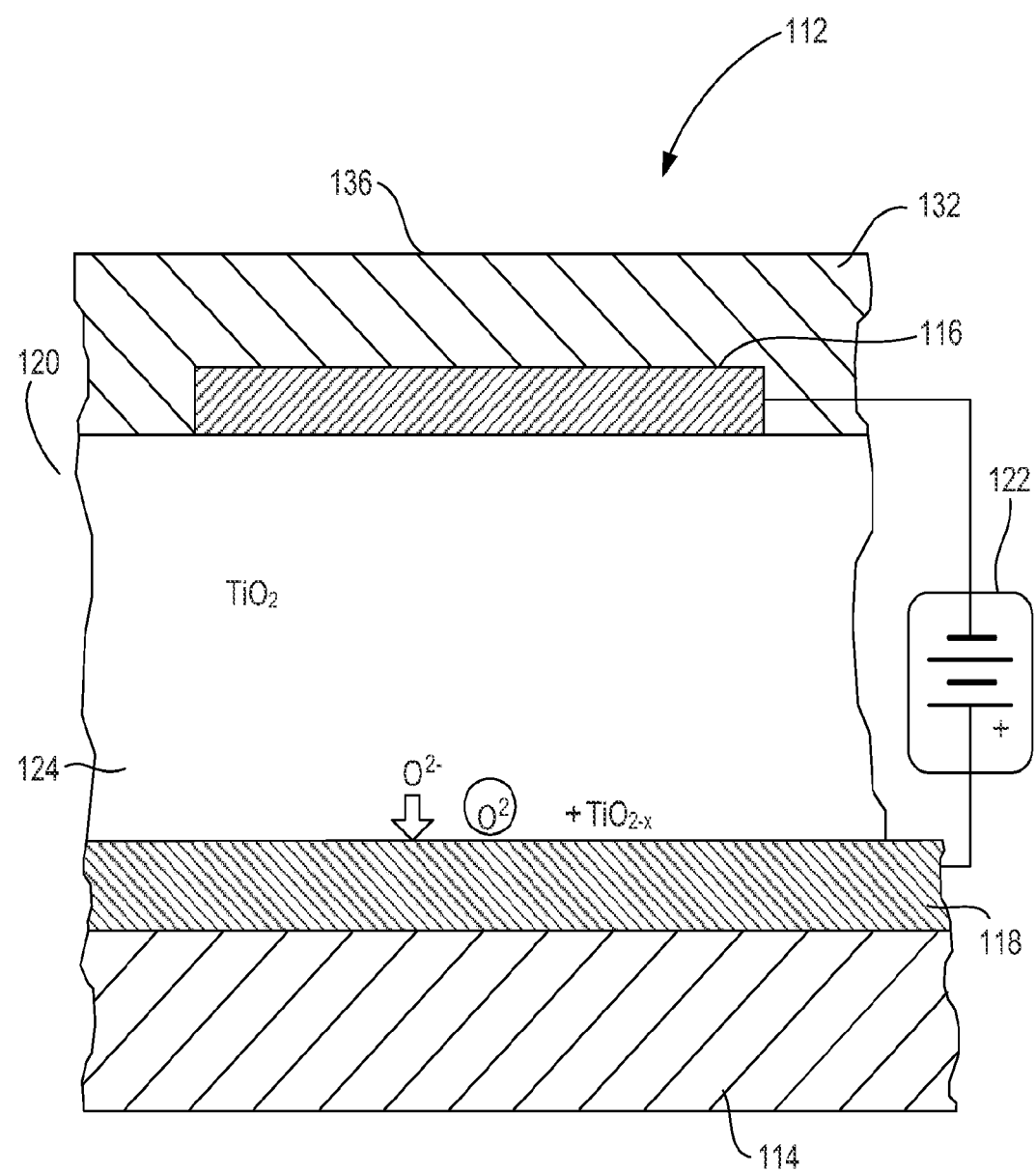
FIG. 2 is a schematic cross-sectional view of a nano-scale mechanical actuator in the array of FIG. 1.

FIG. 2 shows a nano-scale mechanical actuator 112 formed at the intersection of a nanowire 102 in the first layer and a nanowire 104 in the second layer. The actuator 112, which is built on a substrate 114, includes a top electrode 116, a bottom electrode 118, and an active region 120 sandwiched between and in electrical contact with the top and bottom electrodes. In this embodiment, the top electrode 116 is a segment of a nanowire 102 in the first layer, and the bottom electrode 118 is a segment of a nanowire 104 in the second layer. When the two nanowires 102 and 104 forming this junction are selected via the addressing scheme mentioned above, the two nanowires can be connected to a voltage source 122 of a control circuit to apply a voltage between the two electrodes 116, 118 and across the active region 120.

In accordance with a feature of the invention, the active region 120 comprises a material that is electrolytically decomposable. As used herein, the term "electrolytically decomposable material" means that the material can be decomposed in an electrolytic process caused by applying a voltage bias between the electrodes 116 and 118. The electrolytically decomposable material in the active region 120 may be, for example, a metal oxide or metal nitride. In the embodiment shown in FIG. 2, the electrolytically decomposable material is $TiO_2$.

When a voltage of sufficient magnitude is applied to the electrodes 116 and 118, chemical reduction and oxidation take place at the interfaces between the electrolytically decomposable material and the electrodes. The positive electrode functions as the anode and the negative electrode functions as the cathode in the electrolytic reaction. As the result of the oxidation effect at the anode, a gas bubble is formed at the anode. The local structural deformation caused by the bubble can then be used, via suitable mechanical coupling, to provide nano-scale actuation in a controlled manner.

Figure 3A:
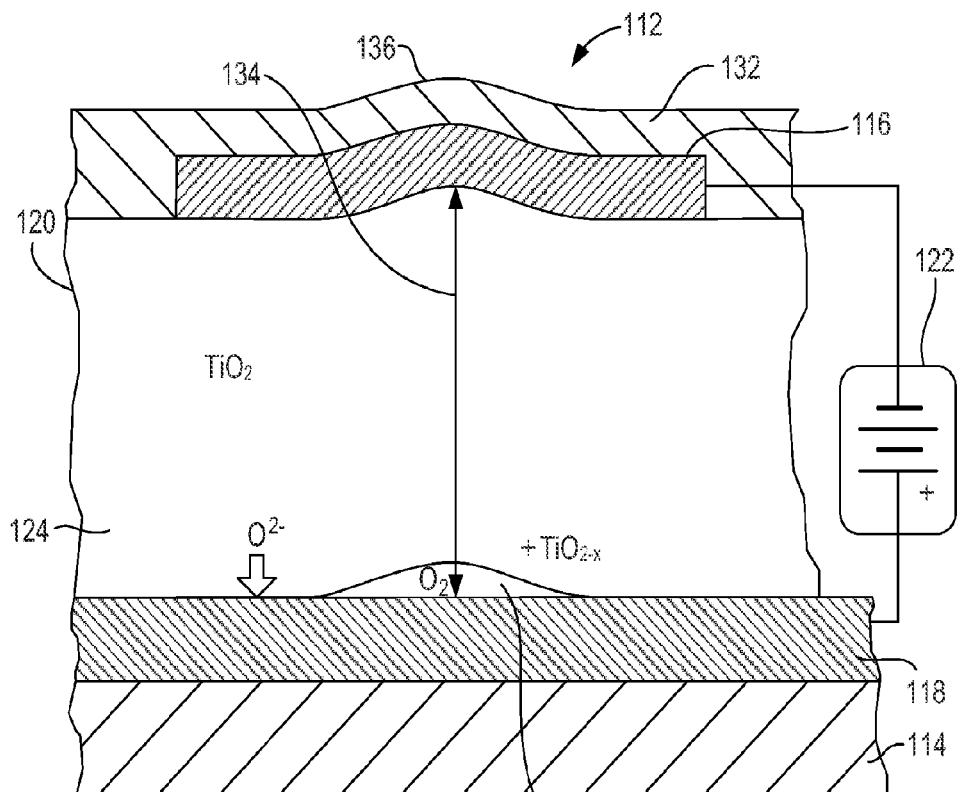
FIGS. 3A and 3B are schematic cross-sectional views of the nano-scale mechanical actuator in two different activation modes, in accordance with embodiments of the invention.
Figure 3B:
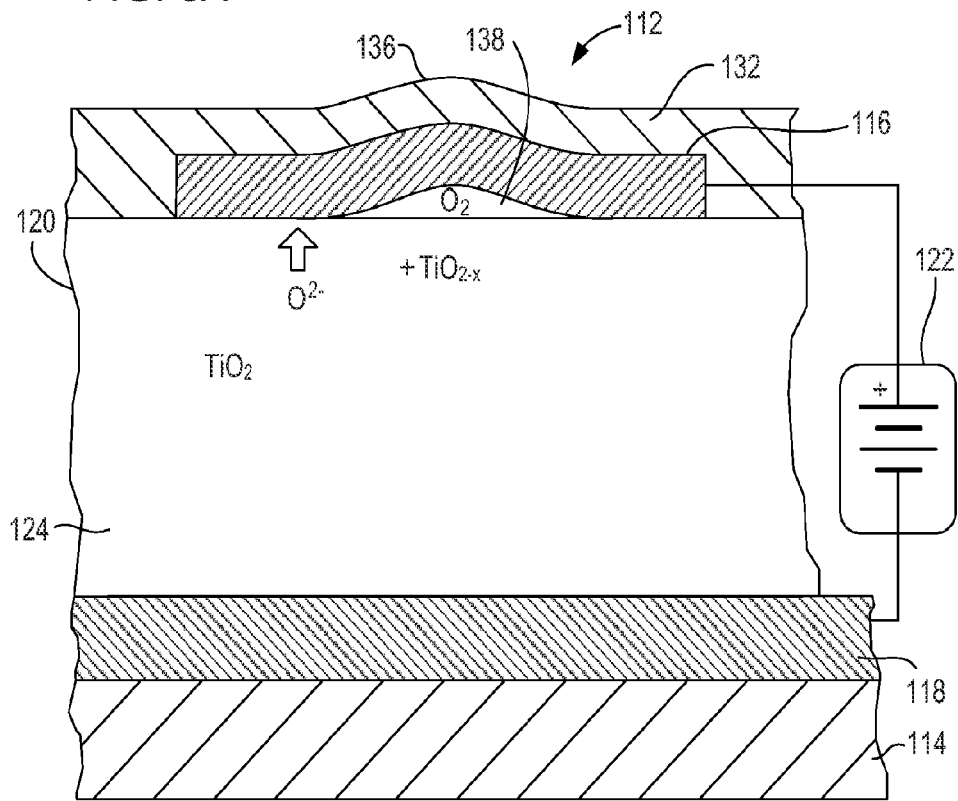

To further explain this phenomenon, FIGS. 3A and 3B show the actuator 112 with a bubble formed at different locations. In the operation mode shown in FIG. 3A, the bottom electrode 118 is the anode, i.e., a positive voltage is applied to the bottom electrode 118 relative to the top electrode 116. To activate the actuator 112, the actuator is selected to receive an activation voltage from the voltage source 122. When the voltage exceeds a threshold voltage, $O^{2-}$ ions in the $TiO_2$ material adjacent the electrode 118 become "oxidized" in the sense that they lose electrons, and are turned into $O_2$ gas. In the meantime, oxygen vacancies formed at this interface due to the loss of $O^{2-}$ ions drift into the active region 120 toward the top electrode 116, which is the cathode in this electrolytic process. The introduction of the oxygen vacancies reduce the $TiO_2$ material into $TiO_{2-x}$, where x is a number significantly smaller than 1.

The $O_2$ gas formed by this electrolytic decomposition process is trapped between the $TiO_2$ layer 124 and the bottom electrode 118. As the $O_2$ gas accumulates at the interface between the $TiO_2$ material and the bottom electrode 118, it forms a bubble 128. If the $TiO_2$ layer is properly deposited, it is sufficiently densely packed to prevent the $O_2$ gas from escaping through the active region 120. In this regard, the $TiO_2$ layer 124 may be formed by physical vapor deposition (sputtering) or atomic layer deposition (ALD) which typically yields films of sufficiently high quality. Alternatively or optionally, a passivation layer 132 may be deposited over the top electrode 116 to encapsulate the entire actuator 112 to prevent the $O_2$ gas from escaping.

Because a gas typically occupies about 3 orders of magnitude more volume than a solid does, a sizable bubble can be formed by reducing only a small portion of the TiO2 in the active region 120. Due to the formation of the bubble 128 at the bottom electrode 118, the separation 134 between the bottom electrode 118 and the top electrode 116 is increased locally. This causes a bulging of the top surface 136 of the actuator. In accordance with a feature of the invention, the physical displacement associated with this bulging or rising of the top surface can be used, via suitable mechanical coupling, to effect the actuation of a miniature mechanical device. Because the size of the actuator 112 is tied to the widths of the electrodes 116 and 118 and the thickness of the active region 120, which are all on the nanometer scale, the actuator is extremely compact and thus suitable for actuating nano-scale electro mechanical devices (NEMS). Moreover, such a nano-scale actuator can also be used to actuate micro-scale electro mechanical devices (MEMS), when fine physical movements or adjustments on the nano-scale are desired.

The size of the bubble 128 depends on the amount of $O^{2-}$ ions converted into $O_2$ gas in the electrolytical reaction, which in turn depends on the time integral of the current passed across the active region 120 between the top and bottom electrodes 116 and 118. Thus, the size of the bubble 132 can be easily adjusted by controlling the duration and magnitude of the current to achieve a desired amount of actuation.

Furthermore, the formation of the bubble 128 is reversible. After the bubble 128 is formed as shown in FIG. 3A, the polarity of the voltage between the electrodes 116 and 118 may be reversed so that the positive voltage is now applied to the top electrode 116 and the negative voltage is applied to the bottom electrode 118. In other words, the top electrode is now the anode, and the bottom electrode is the cathode of the electrolytic reaction. This causes the $O_2$ gas in the bubble 128 to be turned back into $O^{2-}$ ions, which is diffused back into the $TiO_{2-x}$ material in the active region. As the $O_2$ gas is absorbed back by the $TiO_2$ layer 124, the size of the bubble 128 is reduced. When the bubble 128 ultimately disappears, the actuator 112 is returned to the un-actuated state as shown in FIG. 2.

As an alternative to the actuator operation in FIG. 3A, where the bubble 128 is formed at the bottom electrode 118, a bubble may be formed at the top electrode 116 instead. As shown in FIG. 3B, this is done by applying a positive voltage to the top electrode 116 relative to the bottom electrode 118, with the actuator 112 initially in the un-actuated state as shown in FIG. 2. In this case, the top electrode 116 is the anode, and the bottom electrode 118 is the cathode. Due to the same reduction/oxidation (or "redox") mechanism described above, a bubble 138 is formed at the interface between the top electrode 116 and the TiO2 material in the active region 120. The bubble 138 causes the top electrode 118 to bulge, thereby increasing the local separation between the bottom and top electrodes. Again, the displacement of the top surface 136 of the actuator caused by this bulging can be used to actuate a nano-scale or microscale electro mechanical device. If needed, an optional passivation layer 132 may help prevent the $O_2$ gas from escaping through the top electrode. The passivation layer is usually a dielectric material, such as an oxide or a nitride or an oxynitride.

Figure 4:
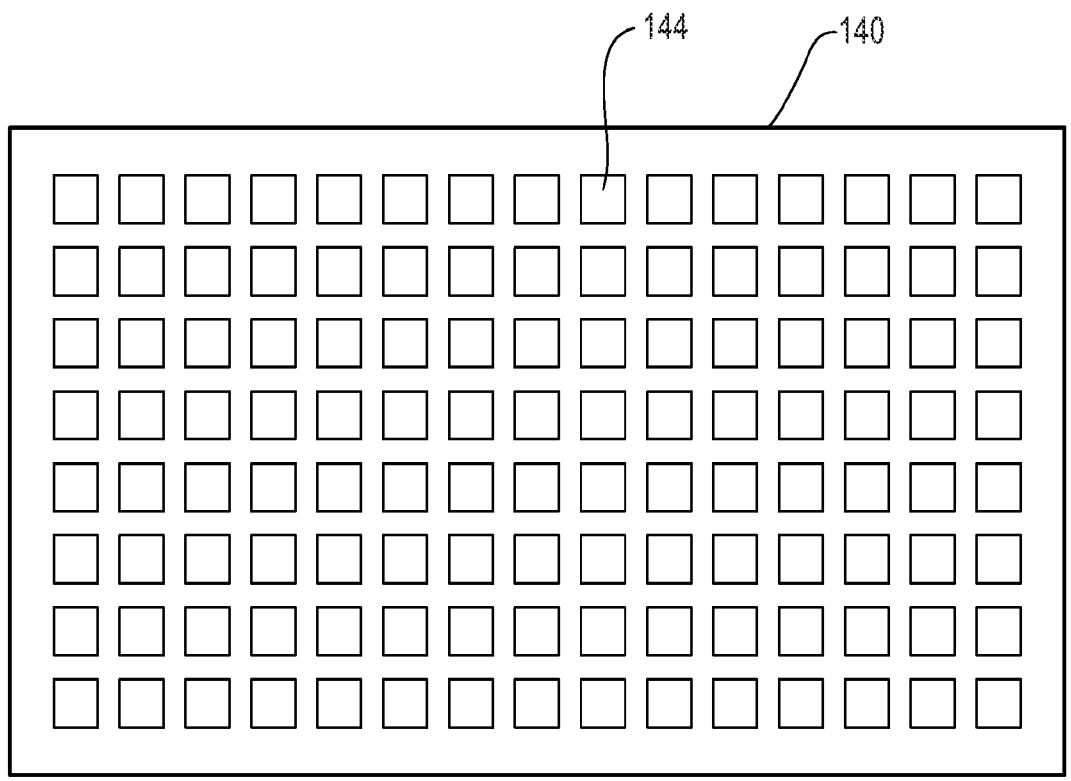
FIG. 4 is a schematic front view of a nano-scale two-dimensional mirror array with mirrors that may be individually actuated by means of the actuator array of FIG. 1, in accordance with an embodiment of the invention.

The individually addressable nano-scale mechanical actuator array 100 can be used in various applications where mechanical actuation of multiple nano-scale mechanical devices is needed. By way of example, the actuator array 100 may be used to individually alter the orientations of mirrors 144 in a two-dimensional nano-scale mirror array 140 shown in FIG. 4 to reflect light in different directions. This mirror array 140 may function in a way similar to a micro-scale mirror array used in PLD devices, but on a much smaller scale.

Figure 5A:
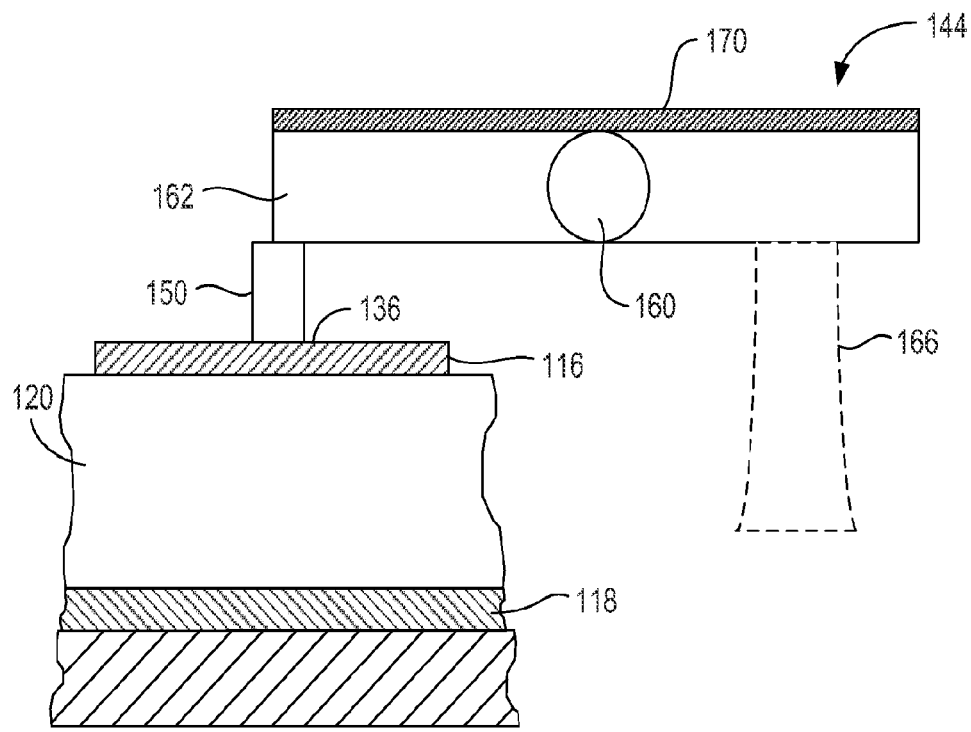
FIGS. 5A and 5B are schematic cross-sectional views of a nano-scale mirror coupled to a nano-scale actuator of FIG. 2 in different actuation states, in accordance with an embodiment of the invention.

To provide the actuation functionality, the mirror array 140 may be laid over the actuator array 100 such that each mirror is mechanically coupled to an actuator underneath it. As illustrated in FIG. 5A, the transfer of the movement of the top surface of the actuator 112 to the mirror 144 may be by means of a mechanical coupler 150, which may be fabricated on the top surface 136 of the actuator 112 or formed as a part of the mirror assembly 144. In the embodiment in FIG. 5A, the coupler 150 is shown as a simple pushrod-like member. More sophisticated or complicated couplers can be used, however, without deviating from the scope of the invention. The nano-scale mirror 144 is shown to have a hinge 160 and a yoke 162, similar to the typical mechanical suspension of a micro-scale mirror in mirror arrays used in PLD applications. Alternatively, the mirror 144 may be supported on a stem 166, which may be bent in reaction to the movement of the coupling member 150 when the actuator is activated.

Figure 5B:
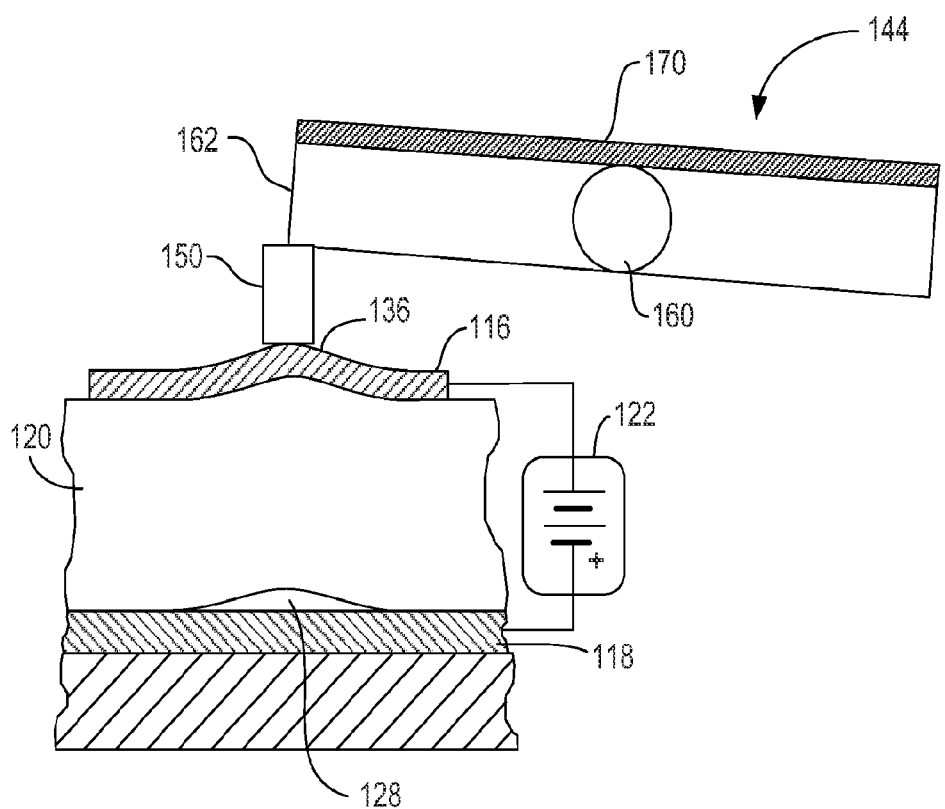

In FIG. 5A, the actuator 112 is in its original or un-activated state. In FIG. 5B, the actuator is activated to form a bubble 128 at the bottom electrode 118. To that end, the nanowires that form the electrodes 116 and 118 of this actuator are selected to receive the activation voltage from the voltage source 122. This causes the upper surface 136 of the actuator to bulge, causing the coupling member 150 to move upward. The coupling member 150 in turn pushes the yoke 162 of the mirror 144 up, thereby tilting the mirror surface 170 to an orientation different from that in FIG. 5A. Once activated, the actuator 112 may stay in the actuated state, as the bubble size is not changed when the voltage on the electrodes is removed. This ability to provide steady-state actuation allows the actuator to be used in many applications where position of the mechanical device being actuated is intended to be permanent or is to be changed infrequently. Nevertheless, the reversibility of the electrolytic reaction as described above allows the mirror orientation to be further adjusted by increasing or decreasing the amount of $O_2$ gas in the bubble to alter the bubble size.

To return the mirror orientation to its original direction, the electrodes may again be selected, and a deactivation voltage may be applied to the electrodes to absorb the gas in the bubble back into the electrolytically decomposable material in the active region of the actuator 112.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A nano-scale mechanical actuator, comprising:
   a first electrode of a nano-scale width;
   a second electrode of a nano-scale width;
   an active region disposed between and in electrical contact with the first and second electrodes;
   a bubble capable of being formed at an interface between the active region and the first electrode, causing a bulging of a top surface of the actuator,
   wherein the active region comprises an electrolytically decomposable material selected to release a gas to form the bubble when an activation voltage of a first polarity is applied to the first and second electrodes, and to absorb the gas from the bubble when a deactivation voltage having a second polarity opposite to the first polarity is applied to the electrodes.

2. The nano-scale mechanical actuator as in claim 1, wherein the electrolytically decomposable material is a metal oxide.

3. The nano-scale mechanical actuator as in claim 2, wherein the electrolytically decomposable material is titanium oxide.

4. The nano-scale addressable mechanical actuator as in claim 1, further including a mechanical coupling member mechanically coupled to the top surface of the actuator for transferring movement the top surface due to the bulging caused by the bubble.

5. The nano-scale addressable mechanical actuator as in claim 1, wherein the first electrode is a segment of a first nanowire, and the second electrode is a segment of a second nanowire intersecting the first nanowire at an angle.

6. A nano-scale addressable mechanical actuator array comprising:
   a first group of conductive nanowires running in a first direction;
   a second group of conductive nanowires running in a second direction and intersecting the first group of nanowires;
   a plurality of actuators formed at intersections of the first and second groups of nanowires, each actuator having a first electrode formed by a segment of a nanowire of the first group and a second electrode formed by a segment of a nanowire of the second group, and an active region comprising an electrolytically decomposable material sandwiched between the first and second electrodes, at least one actuator capable of having a bubble formed therein, causing a bulging of a top surface of the actuator,
   wherein the electrolytically decomposable material is selected to release a gas to form the bubble when an activation voltage of a first polarity is applied to the first and second electrodes and to absorb the gas from the bubble when a deactivation voltage of a second polarity opposite to the first polarity is applied to the first and second electrodes.

7. The nano-scale addressable mechanical actuator array as in claim 6, where in the electrolytically decomposable material is a metal oxide.

8. The nano-scale addressable mechanical actuator as in claim 7, wherein the electrolytically decomposable material is titanium oxide.

9. The nano-scale addressable mechanical actuator array as in claim 6, further including a mechanical coupling member mechanically coupled to the top surface of the actuator for transferring movement of the top surface due to bulging caused by the bubble.

10. The nano-scale addressable mechanical actuator array as in claim 6, wherein the actuators are formed in a two-dimensional array.

11. A method of actuating a nano-scale mechanical device, comprising:
    providing a mechanical coupling between the mechanical device and a top surface of an actuator in an actuator array, the actuator array having a first group of conductive nanowires running in a first direction and a second group of conductive nanowires running in a second direction and intersecting the first group of nanowires, the actuator being formed at an intersection of a first nanowire of the first group and a second nanowire of the second group, and having an active region comprising an electrolytically decomposable material sandwiched between the first and second nanowires;
    selecting the first and second nanowires for connection to a voltage source;
    applying an activation voltage from the voltage source to the first and second nanowires to cause the electrolytically decomposable material to release a gas to form a bubble to cause a bulging of the top surface, thereby actuating the mechanical device through the mechanical coupling.

12. A method as in claim 11, further including the step of:
    connecting the first and second nanowires to receive a deactivation voltage from the voltage source, wherein the deactivation voltage has an opposite polarity with respect the activation voltage and causes the gas to be absorbed into the electrolytically decomposable material, thereby reducing a size of the bubble.

13. A method as in claim 11, wherein the electrolytically decomposable material is a metal oxide, and the gas forming the bubble is oxygen.

14. A method as in claim 13, wherein the metal oxide is titanium oxide.

15. A method as in claim 11, wherein the nano-scale mechanical device is a mirror.

\* \* \* \* \*

UNITED STATES PATENT AND TRADEMARK OFFICE
CERTIFICATE OF CORRECTION

PATENT NO. : 8,437,072 B2  
APPLICATION NO. : 13/256256  
DATED : May 7, 2013  
INVENTOR(S) : Yang et al.

Page 1 of 1

It is certified that error appears in the above-identified patent and that said Letters Patent is hereby corrected as shown below:

In the Claims:

In column 5, line 55, in Claim 4, after "nano-scale" delete "addressable".

In column 5, line 60, in Claim 5, after "nano-scale" delete "addressable".

In column 6, line 22, in Claim 7, delete "where in" and insert -- wherein --.

In column 6, line 24, in Claim 8, after "actuator" insert -- array --.

Signed and Sealed this  
Twenty-ninth Day of October, 2013

Teresa Stanek Rea  
*Deputy Director of the United States Patent and Trademark Office*